Jan. 26, 1954 H. GROSS ET AL 2,667,303

CASH REGISTER KEY COUPLER MECHANISM

Filed March 20, 1951 4 Sheets-Sheet 1

Inventors
Henry Gross &
Samuel Gross
By Young, Emery & Thompson
Attorneys

Jan. 26, 1954 H. GROSS ET AL 2,667,303

CASH REGISTER KEY COUPLER MECHANISM

Filed March 20, 1951 4 Sheets-Sheet 2

Inventors
Henry Gross &
Samuel Gross
By Young, Emery & Thompson
Attorneys

Jan. 26, 1954 H. GROSS ET AL 2,667,303

CASH REGISTER KEY COUPLER MECHANISM

Filed March 20, 1951 4 Sheets-Sheet 3

Inventors
Henry Gross
Samuel Gross
By Young, Emery & Thompson
Attorneys

Inventors
Henry Gross &
Samuel Gross
By Young, Emery & Thompson
Attorneys

Patented Jan. 26, 1954

2,667,303

UNITED STATES PATENT OFFICE 2,667,303

CASH REGISTER KEY COUPLER MECHANISM

Henry Gross and Samuel Gross, East Finchley, London, England

Application March 20, 1951, Serial No. 216,536

Claims priority, application Great Britain March 30, 1950

7 Claims. (Cl. 235—15)

This invention relates to cash registers and like machines of the kind having a series of pivoted levers carrying amount keys to be depressed by the operator, hereinafter called operating keys, which on being actuated effect differential movement of suitable elements such as toothed sectors, the movements of said elements being applied to the adding or other calculating mechanism and, if desired, to indicator elements which show the amounts added.

While with such machines the operator may actuate all the appropriate keys simultaneously, some machines are provided with means which enables the several operating keys to be depressed, either simultaneously or in succession, to a "pre-set" position intermediate the normal (raised) and operating (fully depressed) positions and held in such intermediate position until at least one of the partially depressed operating keys is further depressed, the movement of said key (or keys) to the fully depressed position being transmitted to all other partially depressed keys through the engagement of corresponding key levers with a pivoted coupler bar, whereby the desired amount is applied to the adding mechanism. The operating keys are locked with the coupler bar against return to the normal position by a series of pawls (one for each denomination or "bank" of amount keys) provided at the tip of said coupler bar which are tripped by the key levers and enter notches in said levers as the latter are being rocked into said pre-set position. In case an incorrect operating key should have been partially depressed, it is known to provide an error-release key which, on actuation, releases all partially depressed keys and enables them to return to their normal positions.

It is an object of the present invention to provide a construction in which the aforesaid pawls on the coupler bar are rendered unnecessary. Another object is so to simplify the construction that any partially depressed or pre-set operating key can be returned to the normal position independently of the other pre-set keys, thereby avoiding unnecessary repetition in setting up the operating keys in the event of an error occurring and consequently reducing the operating time.

According to the invention a cash register or like machine comprises a coupler bar pivotally mounted on an axis so disposed in relation to the axis of the operating key levers that the arc traversed by a tip of the coupler bar intersects the arc traversed by a tip of a notch in each of said levers whereby the coupler bar is caused to enter the notches as the levers are being actuated, and means for moving the coupler bar to a pre-set position at which it is engaged by the actuated key levers as the latter reach an intermediate position in their operative movements, the tip of the bar then being so disposed relatively to the tip of the notch in each actuated lever as either to permit any such lever to be returned independently to its initial position or, upon movement of said bar beyond the pre-set position, to engage with the notches in the actuated key levers and thereby move said levers beyond said intermediate position, the movement of the coupler bar beyond the pre-set position being effected by actuation of an operating key lever beyond its intermediate position. Thus any incorrectly actuated operating key lever can be flicked back to its normal position without affecting any other of said levers.

Preferably some form of light spring loading is provided for normally retaining each operating key lever in either the normal or intermediate position. Preferably also, a special "pre-setting" key is provided which has a limited movement in relation to the operating keys and which, on actuation, rocks the coupler bar to the pre-set position such that the operating keys can be actuated in the manner defined above, the key then being locked in said position at least until the operating key levers have been moved beyond their intermediate position.

Provision may be made for automatically releasing the pre-setting key and enabling it to return to its inoperative position after each pre-set operation of the machine, such means comprising, for example, a pivoted latch which engages an abutment on the pre-setting key lever when the latter is moved to the operative position and is rocked to disengage from said abutment by a pin or the like on the coupler bar as the latter approaches the end of its operative movement corresponding to a full depression of the operating keys.

An embodiment of the invention is illustrated by way of example in the accompanying drawings, wherein.

Figure 3:
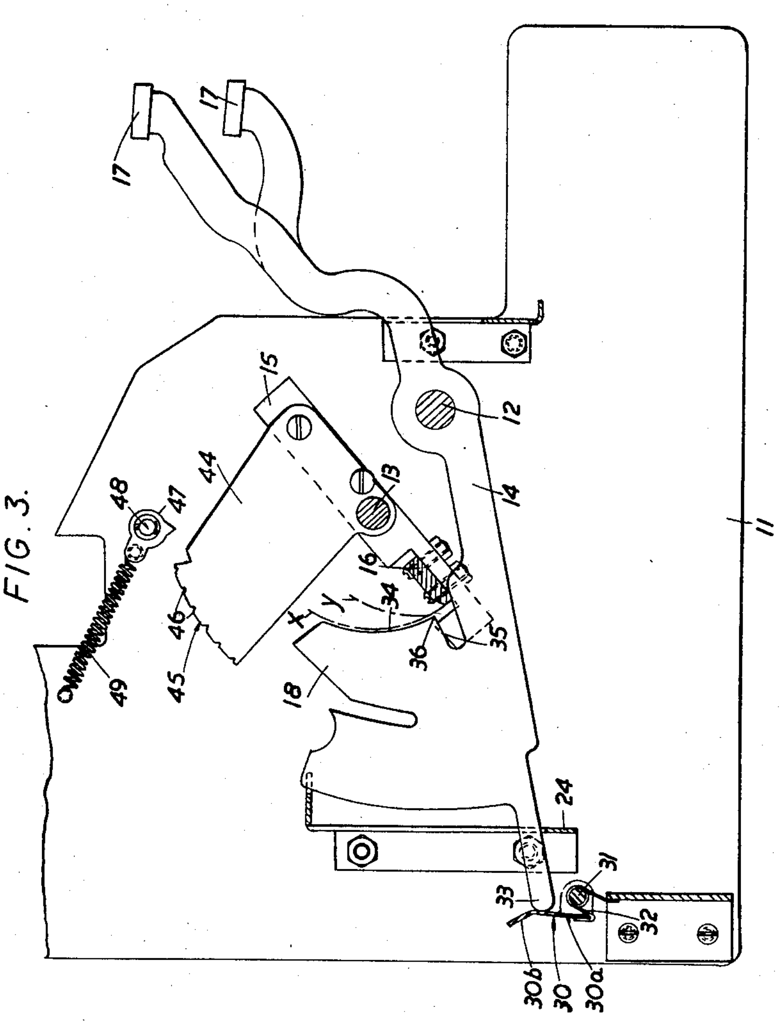
Figure 3 is a vertical section on line III—III of Figure 1 showing one of the operating key levers in its normal position or inoperative position.

The machine illustrated in the drawings is of conventional form and comprises a frame including end walls 10, 11 supporting transverse shafts 12, 13, the former carrying a series of freely rotatable key levers 14 and the shaft 13 having secured thereto at its opposite ends a pair of arms 15 to which is secured a coupler bar 16 extending across the machine above the levers 14 to the rear of shaft 12. The front ends of said levers carry keys 17 bearing the usual currency symbols and are arranged in four banks corresponding to pounds and 10/—*d*, 1 to 9 shillings, 1 to 11 pence, and fractions of one penny, or other symbols for different currencies. Any convenient or known means are provided for preventing actuation of more than one key in a bank during each transaction. The operating key levers are provided at their rear ends with upstanding cam portions 18 by which said levers are engaged with the toothed sectors of the adding mechanism (not shown). The coupler bar 16 is downwardly and rearwardly inclined and its lower edge or tip rests on the key levers, as shown in Figure 3, when said levers are in the normal position, under the action of a spring 19.

Figure 1:
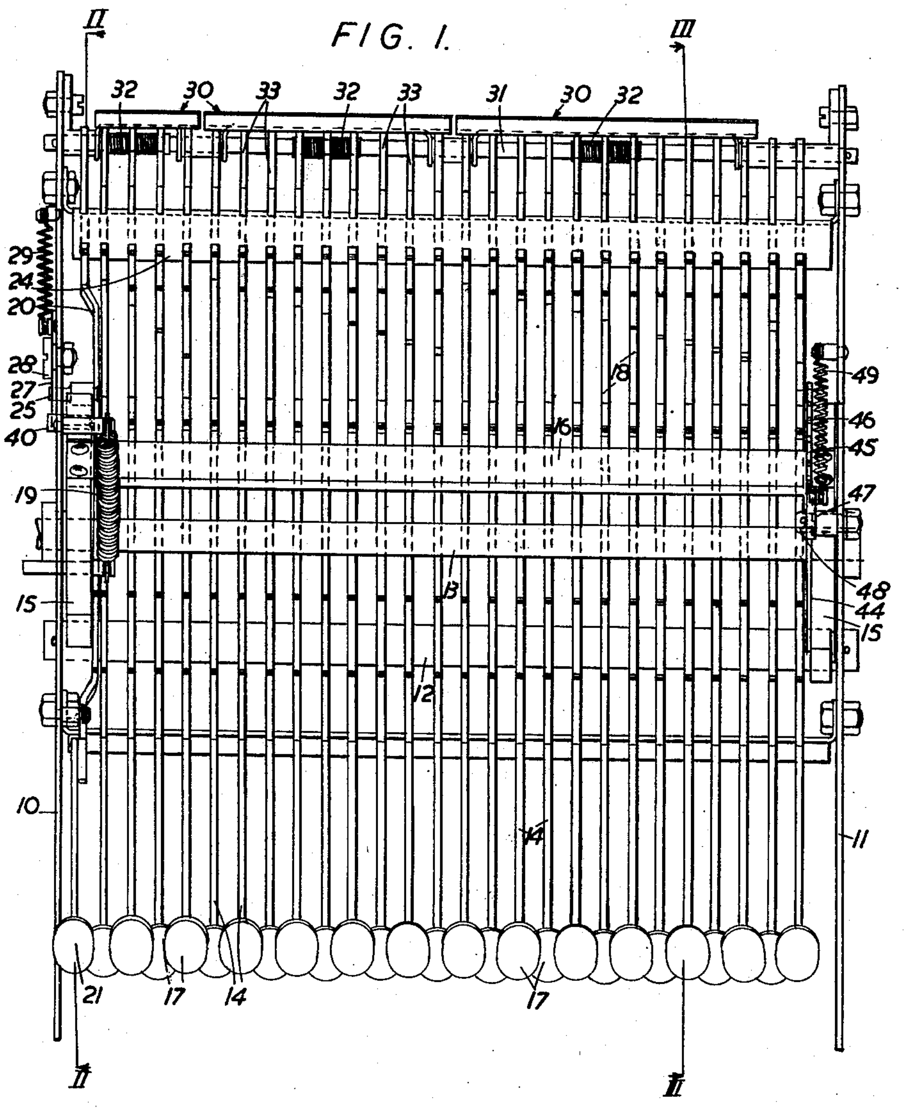
Figure 1 is a plan view of a cash register showing the operating key levers and associated presetting mechanism.
Figure 2:
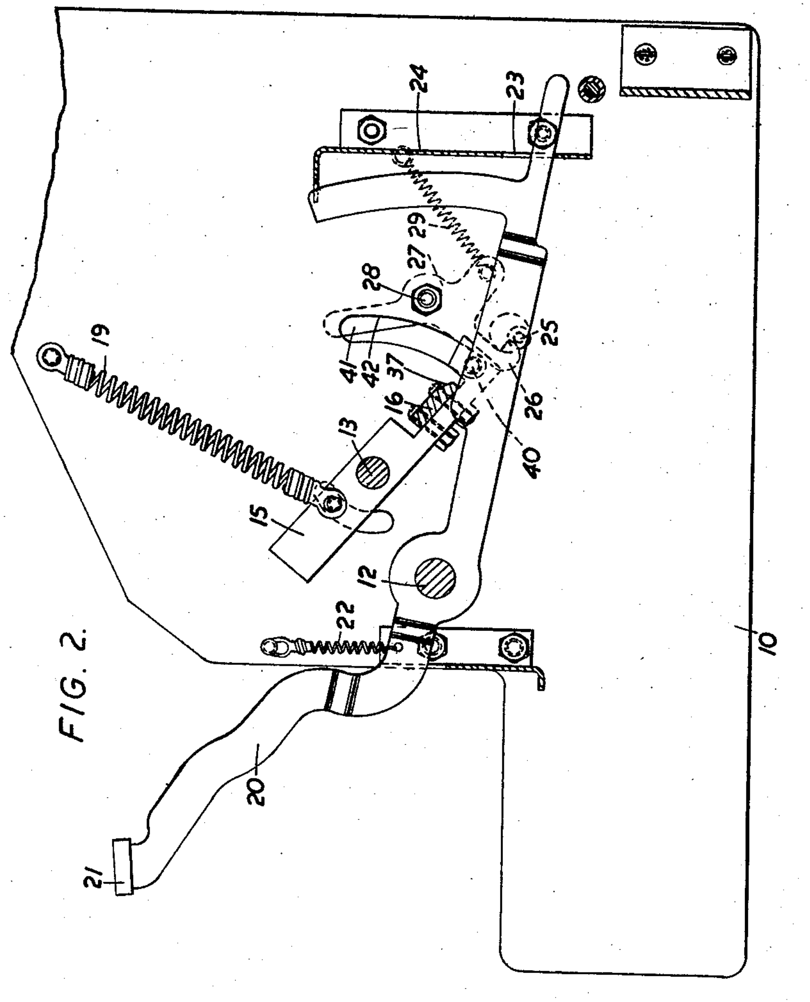
Figure 2 is a vertical section on line II—II of Figure 1 showing the pre-setting key lever in its normal or inoperative position.

Also freely mounted for pivotal movement on the shaft 12 is a pre-setting key lever 20 (Figures 1 and 2) having a key 21 at its front end, said lever in the normal or raised position of the key also being engaged by the lower rear edge of the coupler bar 16. A spring 22 tends to retain the lever 20 in its normal position, and its pivotal movement about shaft 12 is limited by the engagement of its rear end with the upper end of a slot 23 formed in a plate 24 extending across the machine and secured to the end walls 10, 11.

When the pre-setting key 21 is depressed to move lever 20 to the full extent permitted by the slot 23, an abutment pin 25 on said lever is engaged by the nose 26 of a latch 27 pivoted at 28 on the end wall 10, said latch being urged into its operative position by a spring 29. The lever 20 is thus locked against movement in either direction, and in this position of said lever the coupler bar has been rocked upwardly out of engagement with the operating key levers. These key levers 14 are, however, retained in their normal positions by V-shaped cam plates 30, there being one such plate for each of the pounds and 10/—*d*; 1 to 9 shillings, and the pence bank of keys. These cam plates are pivotally mounted on a transverse shaft 31 supported at the rear of the machine in the end walls 10, 11 and each such plate is urged by a spring 32 so that a somewhat forwardly inclined part 30*a* thereof engages against a tail 33 of each of the key levers in the associated bank and retains said levers in their normal positions.

After depression of the pre-setting key and locking of the lever 20 as described above, any one operating key 17 in each bank may be depressed, by the application of a light pressure sufficient to rock the associated cam plate 30, until its lever 14 again engages with and is arrested by the coupler bar 16. In this position of an operating key lever, which is referred to herein as the "pre-set" position, the tail 33 of said lever is engaged by a rearwardly inclined part 30*b* of the corresponding cam plate 30, whereby said lever is lightly held against return to its normal position. The other key levers in the same bank remain held in their normal positions under the action of the cam plate 30.

Figure 4:
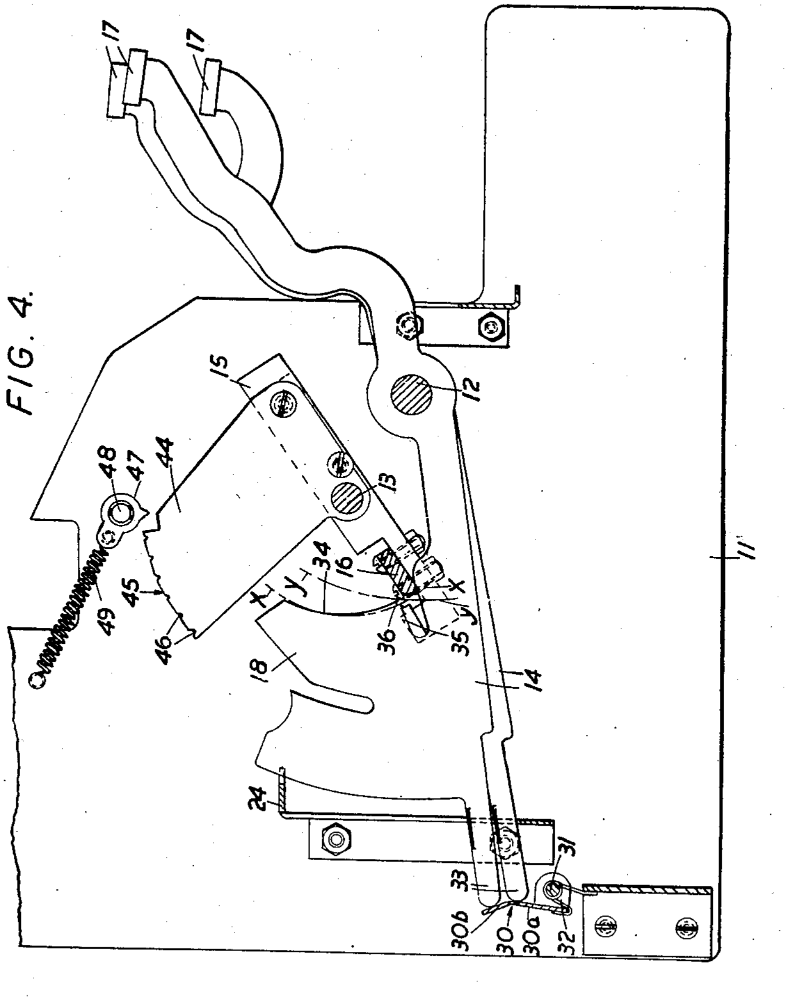
Figure 4 is a view similar to Figure 3 showing an operating key lever in the pre-set position.

The forward edge 34 of the aforesaid cam portion 18 on each operating key lever is arcuately shaped so that when said lever is in the normal position shown in Figure 3, said forward edge is concentric with the shaft 13 and provides for uninterrupted movement of the coupler bar. At its lower end the said forward edge of each cam portion 18 is undercut so as to define with the upper edge of the associated lever a rearwardly extending notch 35. During the pivotal movement of the pre-setting lever 20 to the operative position shown in Figure 2, the rear end of the coupler bar is moved through an arcuate path concentrically about the shaft 13 and represented in Figures 3 and 4 by the chain line $x—x$, there being sufficient clearance between said path of movement and the edge 34 of the cam portion 18 to allow for the free movement of the coupler bar. When thereafter an operating key is depressed the tip 36 formed at the intersection of the edge 34 with the upper face of the notch 35 is moved in an arcuate path, represented by the chain line $y—y$, which is concentric with respect to the shaft 12. As will be seen from Figures 3 and 4, these two paths $x—x$ and $y—y$ intersect, but in the pre-set position of an operating key lever shown in Figure 4 the tip of the bar is just clear of the line $y—y$ so that any operating key lever can be freely moved to the pre-set position. By reason of this, it follows that any "pre-set" operating key lever can be returned to its normal position simply by applying to its key a light upward pressure sufficient to overcome the retaining influence of the corresponding cam plate 30.

When all the required keys 17 have been lightly depressed to the pre-set position, operations which can be effected successively or concurrently and in which, as explained above, said keys are arrested by the engagement of their levers with the coupler bar 16, further depression of any one of said keys will cause the corresponding lever to move the coupler bar upwardly out of engagement with the other pre-set levers. As will be seen from the drawings, the mouth of the notch 35 in each lever 14 is substantially wider than the thickness of the tip of the coupler bar thereby allowing an idle movement of any key which is manually depressed beyond its pre-set position, and also that the point of intersection of the arcuate lines $x—x$ and $y—y$ lies just within the mouth of each pre-set operating key lever which has not been further actuated by depression of its key. Thus the tips 36 of the notches in these remaining pre-set key levers will be engaged by the rear end of the coupler bar as the latter is raised and all the operating key levers will thus be rocked simultaneously towards the fully depressed position of their keys and so impart the desired differential movements to the adding mechanism. The dimensioning of the mouth of each notch 35 in relation to the thickness of the coupler bar tip may be such that the downward movement of the key of any pre-set operating key lever from the pre-set position to the position in which the coupler bar engages the tips 36 of the notches in the remaining pre-set levers 14 may be between one quarter and one half inch. The angle of intersection of the arcuate lines $x—x$ and $y—y$ is also preferably such that after the tip 36 of each notch has been engaged by the coupler bar, the latter moves rapidly into the notch, especially at the commencement of the movement from the pre-set position. This large angle of intersection, which may be equivalent to about 30°, ensures not only efficient engagement of the coupler bar with the top face of each notch but also that said bar shall penetrate to a substantial part of its width into each notch in the fully depressed position of the keys. The notches are, as shown, of gradually decreasing or converging width towards their inner ends, with the result that as the coupler bar penetrates each notch it will rock the said remaining pre-set levers at a slightly higher speed than that of the manually actuated lever and thus ensure that all the pre-set levers reach a position corresponding to full depression of their keys at the same instant.

To enable the coupler bar to run easily over the tip 36 of each notch, the top face of said bar may be chamfered adjacent its tip as shown at 37, or may be curved or otherwise suitably shaped.

When the operating key levers which have been pre-set are moved from the pre-set position towards the fully depressed position of their keys as described above, the pre-setting lever 20 remains locked in the operative position by the engagement of the latch nose 26 with the pin 25. As the coupler bar is being moved upwardly from the pre-set position of Figure 3, a pin 40 on the rear end of one of the arms 15 carrying said bar engages against a tail 41 of the latch and rocks the latter against the action of the spring 29 to disengage the nose 26 from the pin 25. The pre-setting lever is then immediately returned to its normal position by the spring 22. The pin 40 projects through an arcuate slot 42 in the end wall 10 concentric with the shaft 13.

To ensure that the selected operating keys shall be fully depressed before being returned, under the weight of the coupler bar assisted by the spring 19, to their normal positions, one of the arms 15 carrying the coupler bar has secured thereto a ratchet plate 44 formed with an arcuate surface 45 which is concentric with the shaft 13. The edge 45 is provided with a series of spaced notches 46 and as the coupler bar is being rocked upwardly the said edge engages a reversible pawl 47 pivoted at 48 on the end wall 11 and under the action of a tension spring 49. Once the first notch 46, i. e., the right-hand notch in Figures 3 and 4, has passed beyond the nose of the pawl, the coupler bar is prevented from returning to its normal position until the pawl has run off the other or left-hand end of the plate 44, and as during this movement the coupler bar is engaged within the notches 35 in the selected operating key levers, the latter also are prevented from returning to their normal positions. This full stroke ratchet plate and pawl mechanism is arranged to become operative after the operator commences to depress one of the selected operating keys 17 beyond its pre-set position and to become inoperative before the coupler bar, during its return movement, has reached the position it occupied when the presetting key was moved to the operative position. This is necessary in order to ensure that the machine will not become locked if the operator should attempt to re-set the key 21 in its operative position during the return movement of the operating key levers, since the pawl 47 will run off the ratchet plate 44 before the coupler bar reaches the pre-set position and re-engages with the pre-setting key lever.

From the foregoing it will be seen that, following actuation of the pre-setting lever 20, selected operating keys 17 can be moved to a pre-set position, either simultaneously or successively, and any incorrectly selected operating key can be returned to its normal position without affecting other selected operating keys simply by flicking said key upwardly. This avoids the necessity, inherent in cash registers and like machines at present fitted with pre-setting mechanism, of having to repeat the pre-setting of all selected operating keys if one of them should be incorrect. The machine operates in the normal manner when the key 21 is not depressed.

We claim:

1. In a calculating machine, a series of operating key levers pivoted on a common axis, a projection extending upwardly from each said lever, each projection being undercut to form with its lever a notch having a tip at the upper side of its mouth, a coupler bar overlying the key levers and having an edge portion engageable with said levers, said bar being pivotable about an axis so disposed in relation to the axis of the key levers that the arc traversed by said edge portion intersects the arc traversed by the tips of the lever notches, means for rocking the coupler bar through a fixed distance to a pre-set position in which the said edge portion thereof is short of the arc traversed by the tips of the lever notches, and in which position said bar serves to arrest the actuated key levers in an intermediate position of their operative movements against a light pressure, and means for resiliently retaining the actuated operating key levers in said intermediate position, the coupler bar in said pre-set position permitting any such actuated key lever to be returned independently to its initial position against the action of said resilient retaining means, while further movement of the coupler bar beyond the pre-set position causes its edge portion to engage the tips of the notches in the actuated key levers and thereby move said levers beyond their intermediate positions, the said further movement of the coupler bar being effected under a greater pressure by the actuation beyond its intermediate position of an operating key lever.

2. A calculating machine as in claim 1, wherein the said retaining means comprises a spring-loaded pivoted cam plate for each bank of operating key levers, each of said levers having an extension at its rear end engageable with said plate.

3. In a calculating machine, a series of operating key levers pivoted on a common axis, a projection extending upwardly from each said lever, each projection being undercut to form with its lever a notch having a tip at the upper side of its mouth, a coupler bar overlying the key levers and having an edge portion engageable with said levers, said bar being pivotable about an axis so disposed in relation to the axis of the key levers that the arc traversed by said edge portion intersects the arc traversed by the tips of the lever notches, a pivoted pre-setting key lever for rocking the coupler bar through a fixed distance to a pre-set position in which the said edge portion of said bar is short of the arc traversed by the tips of the lever notches, and in which position said bar serves to arrest the actuated key levers in an intermediate position of their operative movements, means for resiliently retaining the actuated operating key levers in said intermediate position, the coupler bar in said pre-set position permitting any such actuated key lever to be returned independently to its initial position against the action of said resilient retaining means, while further movement of the coupler bar effected by the actuation of an operating key lever beyond its intermediate position causes the edge portion of said bar to engage the tips of the notches in the other actuated key levers and thereby move said levers beyond their intermediate positions, and means for automatically locking said pre-setting key lever in its operative position at least until the actuated key levers have been moved beyond their said intermediate position.

4. In a calculating machine, a series of operating key levers pivoted on a common axis, a projection extending upwardly from each said lever, each projection being undercut to form with its lever a notch having a tip at the upper side of its mouth, a coupler bar overlying the key levers and having an edge portion engageable with said levers, said bar being pivotable about an axis so disposed in relation to the axis of the key levers that the arc traversed by said edge portion intersects the arc traversed by the tips of the lever notches, a pivoted pre-setting key lever for rocking the coupler bar through a fixed distance to a pre-set position in which the said edge portion of said bar is short of the arc traversed by the tips of the lever notches, and in which position said bar serves to arrest the actuated key levers in an intermediate position of their operative movements, means for resiliently retaining the actuated operating key levers in said intermediate position, the coupler bar in said pre-set position permitting any such actuated key lever to be returned independently to its initial position against the action of said resilient retaining means, while further movement of the coupler bar effected by the actuation of an operating key lever beyond its intermediate position causes the edge portion of said bar to engage the tips of the notches in the other actuated key levers and thereby move said levers beyond their intermediate positions, an abutment on the presetting key lever, a latch engageable with said abutment when the pre-setting key lever is actuated to move the coupler to the pre-set position, and means for disengaging said latch from said abutment as said coupler is moved beyond the pre-set position.

5. In a calculating machine, a series of operating key levers pivoted on a common axis, a projection extending upwardly from each said lever, each projection being undercut to form with its lever a notch having a tip at the upper side of its mouth, a coupler bar overlying the key levers and having an edge portion engageable with said levers, said bar being pivotable about an axis so disposed in relation to the axis of the key levers that the arc traversed by said edge portion intersects the arc traversed by the tips of the lever notches, a pivoted pre-setting key lever for rocking the coupler bar through a fixed distance to a pre-set position in which the said edge portion of said bar is short of the arc traversed by the tips of the lever notches, and in which position said bar serves to arrest the actuated key levers in an intermediate position of their operative movements, means for resiliently retaining the actuated operating key levers in said intermediate position, the coupler bar in said pre-set position permitting any such actuated key lever to be returned independently to its initial position against the action of said resilient retaining means, while further movement of the coupler bar effected by the actuation of an operating key lever beyond its intermediate position causes the edge portion of said bar to engage the tips of the notches in the other actuated key levers and thereby move said levers beyond their intermediate positions, an abutment on the pre-setting key lever, a spring-pressed latch engageable with said abutment when the pre-setting key lever is actuated to move the coupler bar to the pre-set position, a tail extending from said latch, a projection on the coupler bar engageable with said tail as said bar is moved beyond the pre-set position thereby to disengage the latch from the abutment on the pre-setting key lever, and spring means for returning said lever to its initial position.

6. In a calculating machine, a series of operating key levers pivoted on a common axis, an upstanding projection on each said lever, each projection being undercut to form with its lever a notch having a tip at the upper side of its mouth, a coupler bar overlying the key levers and having an edge portion engageable with said levers, said bar being pivotal about an axis so disposed in relation to the axis of the key levers that the arc traversed by said edge portion intersects the arc traversed by the tips of the lever notches, the width of the mouth of the notch in each key lever being substantially greater than the thickness of the said edge of the coupler bar, and means for rocking the coupler bar through a fixed distance to a pre-set position in which the said edge portion thereof is short of the arc traversed by the tips of the lever notches, and in which position said bar serves to arrest the actuated key levers in an intermediate position of their operative movements, and means for resiliently retaining the actuated operating key levers in said intermediate position, the coupler bar in said pre-set position permitting any such actuated key lever to be returned independently to its initial position against the action of said resilient retaining means, while further movement of the coupler bar beyond the pre-set position causes its edge portion to engage the tips of the notches in the actuated key levers and thereby move said levers beyond said intermediate positions, the said further movement of the coupler bar being effected by the actuation beyond its intermediate position of an operating key lever, the notches in the operating key levers being tapered towards their inner ends whereby all the actuated levers are caused to reach the fully actuated position simultaneously by progressive movement of the coupler bar into the notches in said levers.

7. A calculating machine as in claim 6, wherein the said edge portion of the coupler bar is chamfered at that part which engages the projections on the operating key levers.

HENRY GROSS.
SAMUEL GROSS.

References Cited in the file of this patent

UNITED STATES PATENTS

| Number | Name | Date |
| --- | --- | --- |
| 1,729,338 | Fuller | Sept. 24, 1929 |
| 1,915,604 | Green | June 27, 1933 |
| 1,932,888 | Gledhill | Oct. 31, 1933 |
| 2,014,358 | Miller | Sept. 10, 1935 |

FOREIGN PATENTS

| Number | Country | Date |
| --- | --- | --- |
| 600,449 | Great Britain | Apr. 8, 1948 |